US00RE45690E

(19) United States
(12) Reissued Patent
Marra

(10) Patent Number: US RE45,690 E
(45) Date of Reissued Patent: *Sep. 29, 2015

(54) TURBINE BLADE DAMPING DEVICE WITH CONTROLLED LOADING

(71) Applicant: Siemens Energy, Inc., Orlando, FL (US)

(72) Inventor: John J. Marra, Winter Springs, FL (US)

(73) Assignee: SIEMENS ENERGY, INC., Orlando, FL (US)

( * ) Notice: This patent is subject to a terminal disclaimer.

(21) Appl. No.: 14/190,529

(22) Filed: Feb. 26, 2014

Related U.S. Patent Documents

Reissue of:
(64) Patent No.: 8,540,488
Issued: Sep. 24, 2013
Appl. No.: 13/637,106
Filed: Dec. 14, 2009

(51) Int. Cl.
*F01D 5/16* (2006.01)
*F01D 5/26* (2006.01)
*F01D 5/22* (2006.01)

(52) U.S. Cl.
CPC ... *F01D 5/26* (2013.01); *F01D 5/22* (2013.01)

(58) Field of Classification Search
USPC ..... 416/189, 190, 191, 193 R, 194, 500
See application file for complete search history.

(56) References Cited

U.S. PATENT DOCUMENTS

| | | | | |
|---|---|---|---|---|
| 2,772,854 | A * | 12/1956 | Anxionnaz | 416/190 |
| 2,914,299 | A | 11/1959 | Mitchell | |
| 3,055,634 | A | 9/1962 | Mitchell | |
| 3,209,838 | A | 10/1965 | Frankel | |
| 3,216,699 | A | 11/1965 | Schoenborn | |
| 3,451,654 | A | 6/1969 | Johnson | |
| 3,708,244 | A | 1/1973 | Dawson et al. | |
| 3,771,922 | A * | 11/1973 | Tracy | 416/196 R |
| 4,257,741 | A * | 3/1981 | Betts et al. | 416/190 |
| 4,257,743 | A * | 3/1981 | Fujii | 416/196 R |
| 4,734,010 | A | 3/1988 | Battig | |
| 5,695,323 | A | 12/1997 | Pfeifer et al. | |
| 6,341,941 | B1 * | 1/2002 | Namura et al. | 416/190 |
| 8,353,672 | B2 * | 1/2013 | Townes et al. | 416/193 A |
| 8,616,848 | B2 * | 12/2013 | Beeck | 416/189 |
| 2002/0057969 | A1 | 5/2002 | Namura et al. | |

FOREIGN PATENT DOCUMENTS

| | | | | |
|---|---|---|---|---|
| FR | 1034375 | | 7/1953 | |
| GB | 711572 | | 7/1954 | |
| GB | 1234566 | A | 6/1967 | |
| JP | 49120901 | U | 2/1973 | |
| JP | 56092303 | A | 7/1981 | |
| JP | 57056607 | A * | 4/1982 | F01D 5/22 |

* cited by examiner

*Primary Examiner* — Russell Stormer

(57) ABSTRACT

A damping structure for a turbomachine rotor. The damping structure including an elongated snubber element including a first snubber end rigidly attached to a first blade and extending toward an adjacent second blade, and an opposite second snubber end positioned adjacent to a cooperating surface associated with the second blade. The snubber element has a centerline extending radially inwardly in a direction from the first blade toward the second blade along at least a portion of the snubber element between the first and second snubber ends. Rotational movement of the rotor effects relative movement between the second snubber end and the cooperating surface to position the second snubber end in frictional engagement with the cooperating surface with a predetermined damping force determined by a centrifugal force on the snubber element.

13 Claims, 4 Drawing Sheets

FIG. 1A
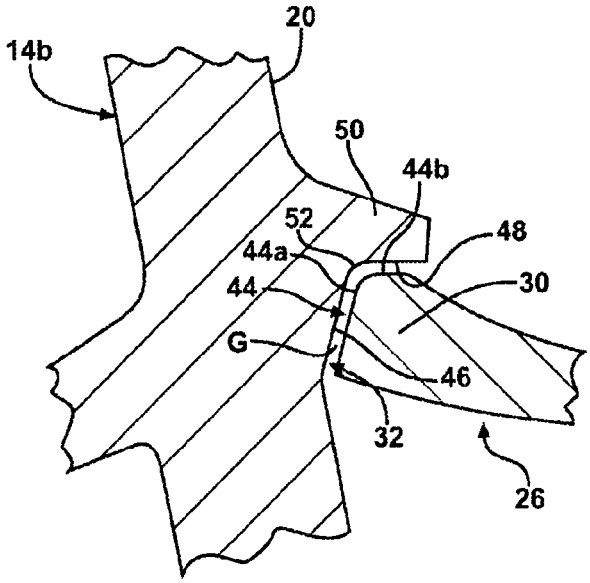
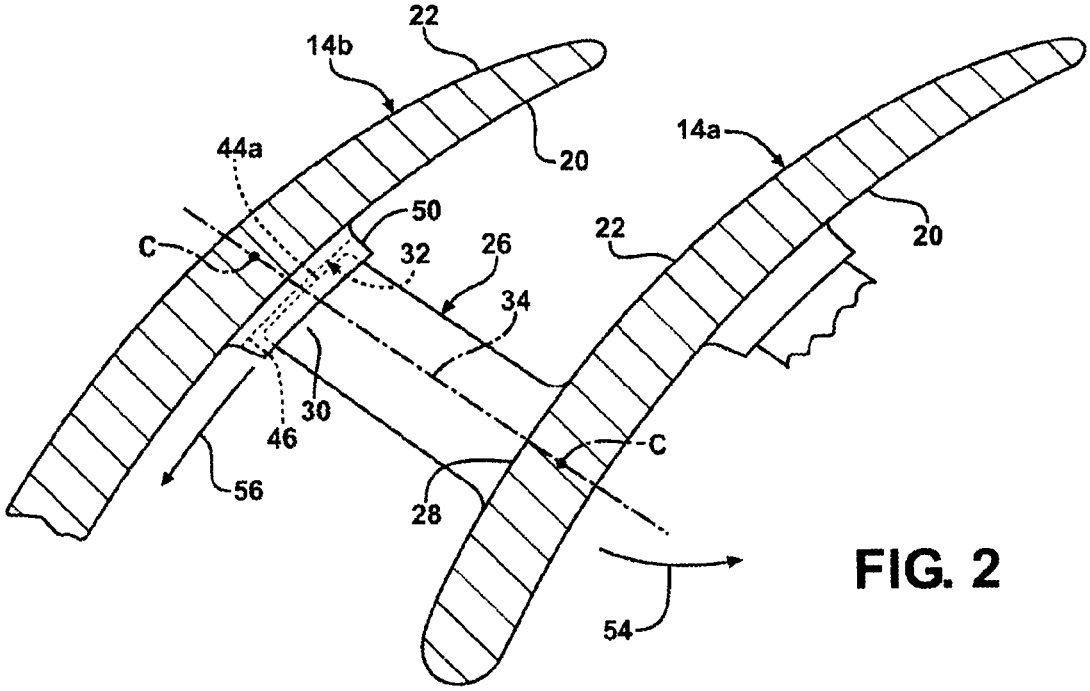
FIG. 2

TURBINE BLADE DAMPING DEVICE WITH CONTROLLED LOADING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This invention was made with U.S. Government support under Contract Number DE-FC26-05NT42644 awarded by the U.S. Department of Energy. The U.S. Government has certain rights to this invention.

CROSS-REFERENCE TO RELATED APPLICATION

This application is related to and filed on even date with an application having Ser. No. 12/637,066 entitled, "TURBINE BLADE DAMPING DEVICE WITH CONTROLLED LOADING", which is incorporated herein by reference in its entirety.

FIELD OF THE INVENTION

The present invention relates generally to vibration damping of turbine blades in a turbomachine and, more particularly, to a damping structure comprising a snubber providing a controlled damping force.

BACKGROUND OF THE INVENTION

A turbomachine, such as a steam or gas turbine is driven by a hot working gas flowing between rotor blades arranged along the circumference of a rotor so as to form an annular blade arrangement, and energy is transmitted from the hot working gas to a rotor shaft through the rotor blades. As the capacity of electric power plants increases, the volume of flow through industrial turbine engines has increased more and more and the operating conditions (e.g., operating temperature and pressure) have become increasingly severe. Further, the rotor blades have increased in size to harness more of the energy in the working gas to improve efficiency. A result of all the above is an increased level of stresses (such as thermal, vibratory, bending, centrifugal, contact and torsional) to which the rotor blades are subjected.

In order to limit vibrational stresses in the blades, various structures may be provided to the blades to form a cooperating structure between blades that serves to dampen the vibrations generated during rotation of the rotor. For example, mid-span snubbers, such as cylindrical standoffs, may be provided extending from mid-span locations on the blades for engagement with each other. Two mid-span snubbers are located at the same height on either side of a blade with their respective contact surfaces pointing opposite directions. The snubber contact surfaces on adjacent blades are separated by a small gap when the blades are stationary. However, when the blades rotate at full load and untwist under the effect of the centrifugal forces, snubber surfaces on adjacent blades come in contact with each other. In addition, each turbine blade may be provided with an outer shroud located at an outer edge of the blade and having front and rear shroud contact surfaces that move into contact with each other as the rotor begins to rotate. The engagement between the blades at the front and rear shroud contact surfaces and at the snubber contact surfaces is designed to improve the strength of the blades under the tremendous centrifugal forces, and further operates to dampen vibrations by friction at the contacting snubber surfaces. A disadvantage of snubber damping is that on large diameter blades it is often difficult to achieve the desired contact forces produced between snubbers as a result of the centrifugal untwisting of the blades. In addition, the large mechanical load associated with large diameter blades typically necessitates larger snubber structures for mechanical stability to avoid outward bending of the snubber, resulting in increased aerodynamic losses and flow inefficiencies due to the flow restriction of larger snubbers positioned in the high velocity flow area through the part-span area.

SUMMARY OF THE INVENTION

In accordance with an aspect of the invention, a damping structure is provided in a turbomachine rotor comprising a rotor disk and a plurality of blades. The damping structure comprises an elongated snubber element including a first snubber end rigidly attached to a first blade and extending toward an adjacent second blade, and an opposite second snubber end positioned adjacent to a cooperating surface at least partly formed on the second blade. The snubber element has a centerline extending radially inwardly in a direction from the first blade toward the second blade along at least a portion of the snubber element between the first and second snubber ends. The cooperating surface defines an axially extending area for accommodating axial movement of the second snubber end along the cooperating surface as the first and second blades untwist during rotor spin-up. Rotational movement of the rotor effects relative movement between the second snubber end and the cooperating surface to position the second snubber end in frictional engagement with the cooperating surface with a predetermined damping force determined by a centrifugal force on the snubber element.

The damping structure may be located at a mid-span location between a blade root and a blade tip of the blade.

The centerline of the snubber element may comprise a substantially smooth curve with a concave side facing radially outwardly extending from the first snubber end to the second snubber end.

The centerline of the snubber element may comprise first and second linear centerline segments and an inflexion angle between the centerline segments at a midway point between the first and second blades, the first centerline segment angling radially inwardly from the first snubber end to the midway point and the second centerline segment angling radially outwardly from the midway point to the second snubber end.

The cooperating surface may comprise a circumferentially facing side at least partially formed on a side of the second blade and a radially inwardly facing side formed on a flange extending from the second blade. The circumferentially facing side and the radially inwardly facing side may define a recess for receiving the second snubber end.

A midway point is defined between the first and second blades and a radial thickness of the snubber element may decrease extending from each of the blades to the midway point.

In accordance with another aspect of the invention, a mid-span damping structure is provided in a turbomachine rotor comprising a rotor disk and a plurality of blades. The damping structure comprises an elongated snubber element including a first snubber end rigidly attached to a first blade and extending toward an adjacent second blade, and an opposite second snubber end positioned adjacent to a cooperating surface at least partly formed on a side surface of the second blade and defining an axially curved bearing surface. The snubber element having a centerline extending radially inwardly in a direction from the first blade toward the second blade along a portion of the snubber element between the first end and a midway point between the first and second blades, and extending radially outwardly from the midway point to the second snubber end. Rotational movement of the rotor effects relative movement between the second snubber end and the cooperating surface to position the second snubber end in frictional engagement with the cooperating surface with a predetermined damping force determined by a centrifugal force on the snubber element.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 1A is an enlarged view of a contact location between a snubber end and a cooperating surface of a blade;

FIG. 2 is view taken on the plane indicated by the line 2-2 in FIG. 1;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
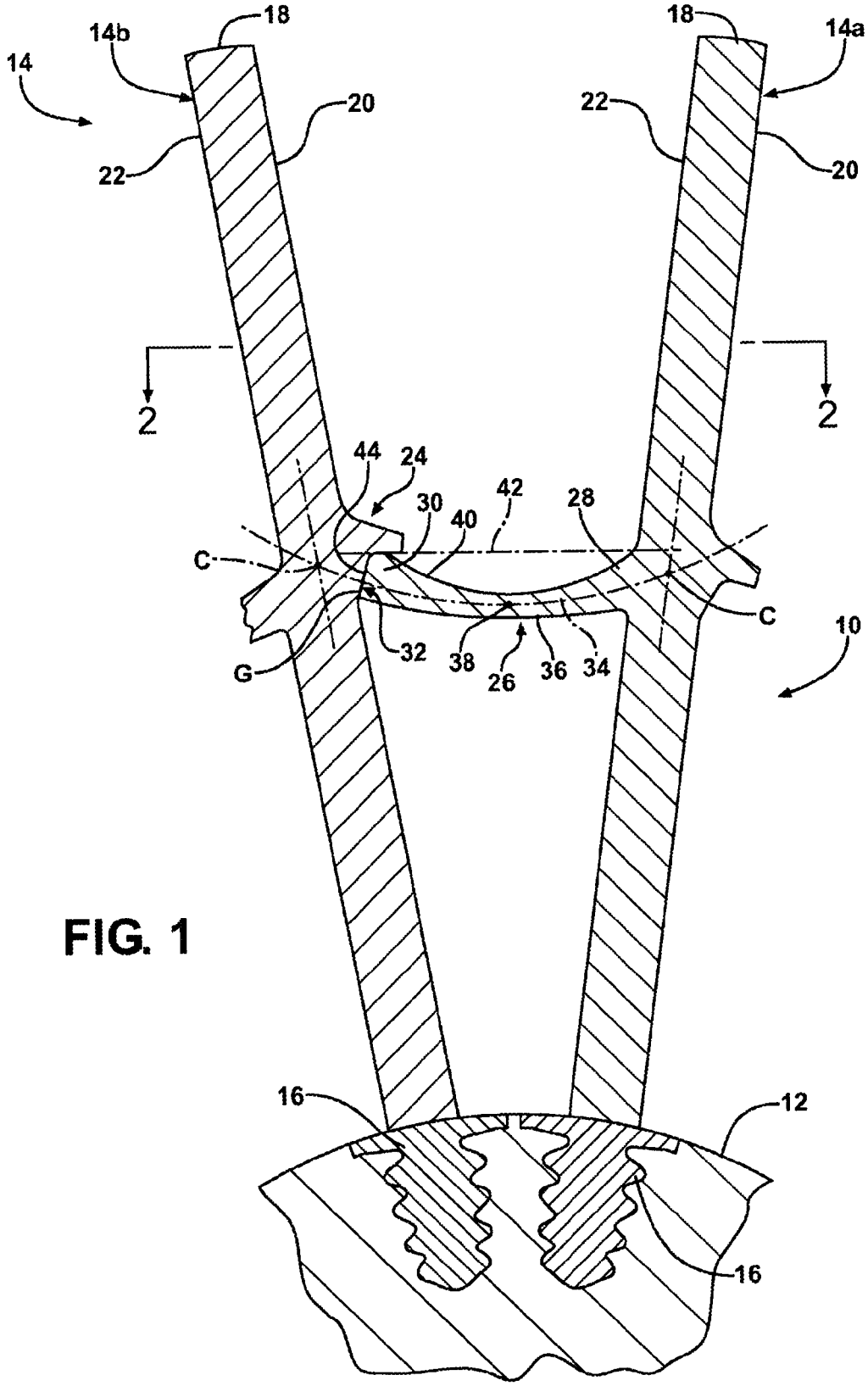
FIG. 1 is a partial end view of a rotor, as viewed in an axial flow direction, taken in a plane perpendicular to an axis of rotation and showing an embodiment of the invention.

Referring to FIG. 1, a section of a rotor 10 is illustrated for use in a turbomachine (not shown), such as for use in a gas or steam turbine. The rotor 10 comprises a rotor disk 12 and a plurality of blades 14, illustrated herein as a first blade 14a and an adjacent second blade 14b. The blades 14 comprise radially elongated structures extending from a blade root 16, engaged with the rotor disk 12, to a blade tip 18. Each of the blades 14a, 14b includes a pressure side surface 20 and a suction side surface 22. The rotor 10 further includes a damping structure 24 extending between the first and second blades 14a, 14b, and located mid-span between the blade root 16 and the blade tip 18 of the blades 14a, 14b.

The damping structure 24 comprises an elongated snubber element 26 including a first snubber end 28 rigidly attached to the suction side surface 22 of the first blade 14a and extending toward the adjacent pressure side surface 20 of the second blade 14b. The snubber element 26 additionally includes an opposite second snubber end 30 positioned adjacent to a cooperating surface 32 associated with the second blade 14b. The cooperating surface 32 is at least partially formed on the pressure side surface 20 of the second blade 14b.

The snubber element 26 defines a centerline 34 extending radially inwardly in a direction from the first blade 14a toward the second blade 14b along a first portion 36 of the snubber element 26 between the first snubber end 28 and a midway point 38 between the first and second blades 14a, 14b. The centerline 34 extends radially outwardly along a second portion 40 of the snubber element 26 from the midway point 38 to the second snubber end 30. The midway point 28 may be defined as any point that is generally at a central region of the snubber element 26 located spaced circumferentially from both the first and second blades 14a, 14b. In the embodiment illustrated in FIG. 1, the centerline 34 comprises a substantially smooth curve that is bowed inwardly, e.g., in the manner of a classical Roman arch, from a circumferential line 42 extending between upper edges of the first and second snubber ends 28, 30, and having a concave side that faces radially outwardly extending from the first snubber end 28 to the second snubber end 30. In addition, the centerline 34 passes through centroids C of the first and second blades 14a, 14b.

Referring further to FIG. 1A, the second snubber end 30 is normally positioned with a small snubber gap G between a snubber end surface 44 and the cooperating surface 32 when the rotor 10 is stationary. The cooperating surface 32 comprises a circumferentially facing side 46 that may be angled circumferentially inwardly in a radial outward direction and faces a similarly angled circumferentially facing portion 44a of the snubber end surface 44. The cooperating surface 32 additionally includes a radially inwardly, facing side 48 formed on a flange 50 extending from the suction side 22 of the second blade 14b. The circumferentially facing side 46 and the radially inwardly facing side 48 define a recess 52 for receiving the second snubber end 30. The circumferentially facing side 46 is preferably angled such that it is substantially normal to the centerline 34 of the snubber element 26, and is generally parallel to the circumferentially facing portion 44a. A radially outer portion 44b of the snubber end surface 44 is located adjacent to the radially inwardly facing side 48 of the flange 50.

As seen in FIG. 2, the circumferentially facing side 46 of the cooperating surface 32 extends in an axial direction for engaging the corresponding circumferentially facing portion 44a on the snubber end surface 44. Further, both the circumferentially facing side 46 of the cooperating surface and the circumferentially facing portion 44a of the snubber end surface 44 may be formed with a curvature in the axial direction to accommodate relative movement between these members during blade untwist.

During spin-up of the rotor 10, a centrifugal force exerted on the snubber member 26 causes the second snubber end 30 to move radially outwardly and into frictional engagement with the cooperating surface 32. Specifically, the during rotation of the rotor 10, the snubber element 26 pivots about the first snubber end 28 and radial outward movement of the second snubber end 30 causes the sloping or angled surfaces 44a and 46 of the snubber end surface 44 and cooperating surface 32, respectively, to engage each other with a predetermined force in a direction generally parallel or tangent to the centerline 34 and extending through the centroid C. Further, the radially outer portion 44b of the snubber end surface 44 engages the radially inwardly facing side 48 of the flange 50, defining a socket area, to limit outward movement of the second snubber end 30 and maintain the second snubber end 30 within the recess 52.

In addition, since the first snubber end 28 is rigidly attached to the first blade 14a, snubber element 26 will pivot with the first blade 14a in a plane generally parallel to the axial and circumferential directions as the first blade untwists during spin-up of the rotor 10. As illustrated in FIG. 2, pivoting movement of the snubber element 26 during blade untwist, depicted by directional arrow 54, will cause the second snubber end 30 to move axially in an arc, as depicted by arrow 56. As noted above, the curvature in the axial direction of the circumferentially facing side 46 of the cooperating surface 32 and the circumferentially facing portion 44a of the snubber end surface 44 accommodates or guides the movement of the second snubber end 30 as the blades 14 untwist. Also, the snubber gap G provided between the snubber end surface 44 and the cooperating surface 32 provides a reduced friction interface for relative movement between these components before centrifugal forces create an engagement force to lock the snubber end surface 44 to the cooperating surface 32.

The second snubber end 30 engages the cooperating surface 32 with a predetermined minimum damping force, where the damping force may be controlled by the inward angle and mass of the snubber element 26. It should be noted that it is desirable to configure the snubber element 26 to produce a damping force that is sufficient to produce damping at the interface between the second snubber end 30 and the cooperating surface 32 to control blade vibration without substantially exceeding this minimum damping force. An excess force at this location may lead to excessive wear and stress on the snubber element 26 and cooperating surface 32.

The inward angle formed by the curvature of the snubber element 26, as defined by the centerline 34, substantially alters the damping force produced by centrifugal force on the snubber element 26. The centrifugal force exerted on the snubber element 26 causes the snubber element 26 to bend outwardly and become less concave, producing the damping force between the blades 14. A larger centerline curvature will produce a greater centrifugal load on the snubber element 26 and a greater damping force applied between the second snubber end 30 and the cooperating surface 32. For example, it is believed that a snubber element 26 having a curvature that matches a catenary curve would cause the snubber element 26 to produce a substantially greater damping force between the blades 14 than would be required to dampen vibrations. Further, it is believed that a snubber element 26 configured with a centerline 34 having a relatively shallow curve may be sufficient to produce an adequate centrifugal force on the snubber element 26 and provide the necessary damping force to reduce blade vibration while effectively controlling the level of force applied.

In order to minimize or reduce inertial loads on the snubber element 26, the snubber element 26 may be formed with a taper extending from either snubber end 28, 30 toward the midway point 38, as seen in FIG. 1. That is the radial thickness of the snubber element 26 may progressively decrease from the snubber ends 28, 30 toward the midway point 38. In addition, the taper may reduce aerodynamic resistance by providing the snubber element 26 with a reduced cross-sectional area, facilitating flow through the turbine between the blades 14.

It should be noted that although a particular configuration for accommodating axial movement of the second snubber end 30 is disclosed, other engagement structure may be provided to accommodate blade untwist. For example, a ball and socket configuration may be provided where the cooperating surface 32 may be formed as rounded socket surface for receiving a ball or partial spherical surface formed on the second snubber end 30.

Figure 3:
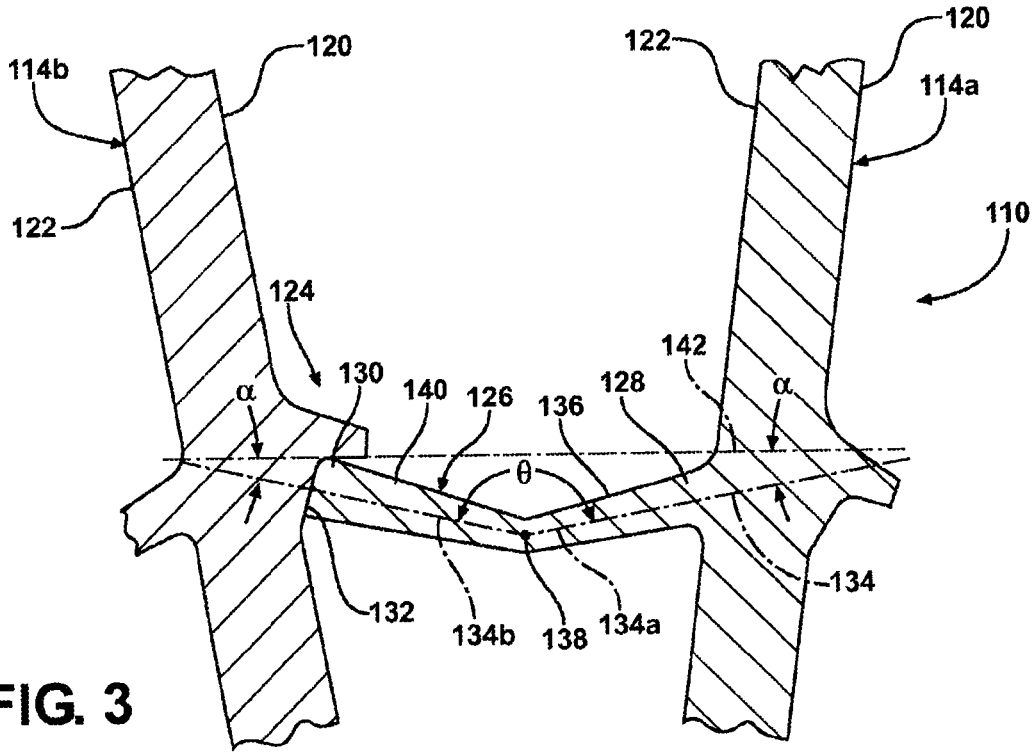
FIG. 3 is a partial end view showing an alternative configuration of the embodiment of FIG. 1.

Referring to FIG. 3, an alternative configuration is illustrated comprising a variation of the embodiment shown in FIG. 1. Elements in FIG. 3 corresponding to elements in FIG. 1 are labeled with the same reference number increased by 100.

In FIG. 3, the snubber element 126 includes a first snubber end 128 rigidly affixed to a first blade 114a and a second snubber end 130 supported adjacent to a cooperating surface 132 on a second blade 114b. The snubber element 126 is formed with first and second linear portions 136, 140 wherein the centerline 134 of the snubber element 126 comprises a first linear centerline segment 134a and a second linear centerline segment 134b. The centerline segments 134a, 134b meet at an inflexion angle θ at a midway point 138 between the first and second blades 114a, 114b. The first centerline segment 136 angles radially inwardly from the first snubber end 128 to the midway point 138, and the second centerline segment 140 angles radially outwardly from the midway point 138 to the second snubber end 130.

The configuration of FIG. 3 provides a damping structure 124 having a triangular configuration that includes a snubber element 126 extending radially inwardly from the circumferential line 142. In a preferred embodiment, the first and second centerline segments 134a and 134b each angle inwardly from the circumferential line 142 at an angle α. The angle α may be in the range of from about 3° to about 20°, and preferably is about 6°, such that the inflexion angle θ is about 178°. The damping structure 124 operates in the manner described above for the damping structure 24 wherein centrifugal forces applied on the snubber element 126 cause the second snubber end 130 to engage the cooperating surface 132 with a predetermined force to provide a controlled damping force for damping blade vibrations. Further, a cooperating surface structure similar to the axially extending cooperating surface 32 of FIG. 2 may be provided to accommodate relative axial movement between the second snubber end 130 and the cooperating surface 132.

Figure 4:
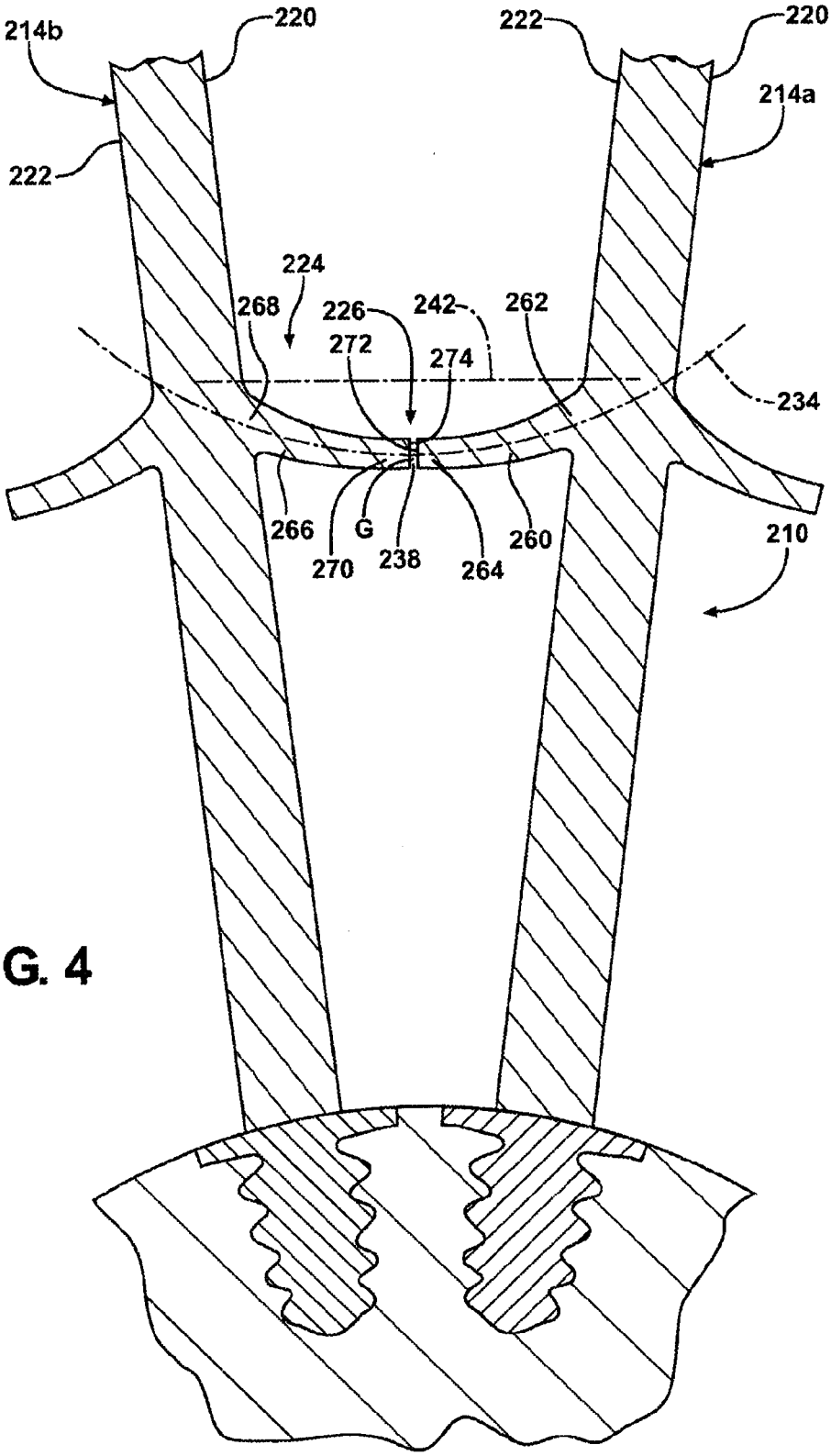
FIG. 4 is a partial end view of a rotor taken in a plane perpendicular to an axis of rotation and showing an alternative embodiment of the invention.

Referring to FIG. 4, an additional embodiment of the invention is described where elements in FIG. 4 corresponding to elements in FIG. 1 are labeled with the same reference number increased by 200. A rotor 210 including a damping structure 224 is illustrated. The damping structure 224 includes a snubber element 226 comprising an elongated first snubber element 260 extending from a first blade 214a toward an adjacent second blade 214b. The first snubber element 260 includes a first snubber end 262 rigidly attached to the first blade 214a, and an opposite second snubber end 264 extending to a midway point 238. An elongated second snubber element 266 extends from the second blade 214b toward the first blade 214a and includes a first snubber end 268 rigidly attached to the second blade 214b, and an opposite second snubber end 270 extending to a midway point 238.

The second snubber end 264 of the first snubber element 260 defines an engagement surface 272 located adjacent to a cooperating surface 274 on the second snubber end 270 of the second snubber element 266 at the midway point 238 between the first and second blades 214a, 214b. A snubber gap G is defined between the adjacent surfaces 272, 274 when the rotor 210 is stationary, i.e., with no centrifugal forces acting on the first and second snubber elements 260, 266.

The first and second snubber elements 260, 266 define a centerline 234 extending radially inwardly in a direction from the first blade 214a toward the midway point 238 and extending radially inwardly in a direction from the second blade 214b toward the midway point 238. The centerline 234 defined by the first and second snubber elements 260, 266 comprises a substantially smooth curve with a concave side facing radially outwardly toward a circumferential line 242 extending between radially outer edges of the first snubber end 262 of the first snubber element 260 and the first snubber end 268 of the second snubber element 266.

Rotational movement of the rotor 210 effects relative movement between the second snubber ends 264, 270 of the first and second snubber elements 260, 266 to close the snubber gap G and position the engagement surface 272 in frictional engagement with the cooperating surface 274 with a predetermined damping force determined by a centrifugal force acting on the first and second snubber elements 260, 266. In particular, the centrifugal force acting on the first and second snubber elements 260, 266 effect a movement of the snubber elements 260, 266 radially outwardly, causing them to pivot toward each other and the snubber gap G to be closed. In addition, it should be noted that the second ends 264, 270 of the snubber elements 260, 266 are located to define the snubber gap G at a location between the blades 214a, 214b where the second ends 264, 270 will remain at substantially the same position relative to each other during rotor spin-up and corresponding blade untwist. Hence, the engagement surface 272 will remain in facing relation to the cooperating surface 274 regardless of blade untwist during rotor spin-up and will be positioned in locking frictional engagement during operation of the turbine.

Figure 5:
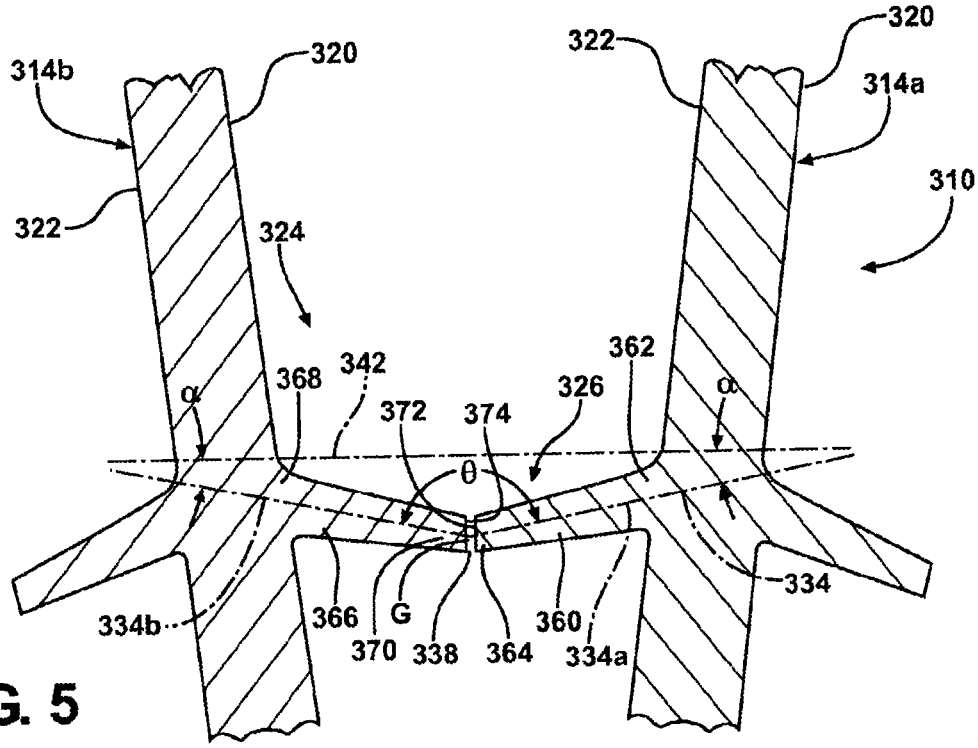
FIG. 5 is a partial end view showing an alternative configuration of the embodiment of FIG. 4.

Referring to FIG. 5, an alternative configuration is illustrated comprising a variation of the embodiment shown in FIG. 4. Elements in FIG. 5 corresponding to elements in FIG. 4 are labeled with the same reference number increased by 100.

In FIG. 5, a rotor 310 including a damping structure 324 is illustrated. The damping structure 324 includes a snubber element 326 comprising an elongated first snubber element 360 extending from a first blade 314a toward an adjacent second blade 314b. The first snubber element 360 includes a first snubber end 362 rigidly attached to the first blade 314a, and an opposite second snubber end 364 extending to a midway point 338. An elongated second snubber element 366 extends from the second blade 314b toward the first blade 314a and includes a first snubber end 368 rigidly attached to the second blade 314b, and an opposite second snubber end 370 extending to the midway point 338.

The second snubber end 364 of the first snubber element 360 defines an engagement surface 372 located adjacent to a cooperating surface 374 on the second snubber end 370 of the second snubber element 366 at the midway point 338 between the first and second blades 314a, 314b. A snubber gap G is defined between the adjacent surfaces 372, 374 when the rotor 310 is stationary, i.e., with no centrifugal forces acting on the first and second snubber elements 360, 366. The first and second snubber elements 360, 366 define a centerline 334 wherein the centerline 334 comprises a first linear centerline segment 334a and a second linear centerline segment 334b extending along the first and second snubber elements 360, 366 respectively. The centerline segments 334a, 334b meet at an inflexion angle θ at the midway point 338 between the first and second blades 314a, 314b.

The configuration of FIG. 5 provides a damping structure 324 having a triangular configuration that includes the first and second snubber elements 360, 366 extending radially inwardly from a circumferential line 342 connecting radially outer edges of the first snubber end 362 of the first snubber element 360 and the first snubber end 368 of the second snubber element 366. In a preferred embodiment, the first and second centerline segments 334a and 334b each angle inwardly from the circumferential line 342 at an angle α. The angle α may be in the range of from about 3° to about 20°, and preferably is about 6°, such that the inflexion angle θ is about 178° when the rotor 310 is stationary. The damping structure 324 operates in the manner described above for the damping structure 224 of FIG. 4 wherein rotational movement of the rotor 310 produces a centrifugal force on the first and second snubber elements 360, 366 to move the snubber elements 360, 366 radially outwardly. As the snubber elements 360, 366 move outwardly, they pivot toward each other and close the snubber gap G. As the snubber gap G is closed the engagement surface 372 is positioned in frictional engagement with the cooperating surface 374 with a predetermined damping force determined by the centrifugal force loading the first and second snubber elements 360, 366. It is believed that the damping structure 324, including the first and second snubber elements 360, 366 positioned at the described angle of 6°, may produce a force at the snubber gap G of approximately 500 N, above any forces that may occur as a result of movements of the blades 314a, 314b, such as may result from blade untwist.

In the embodiments of the invention described with reference to FIGS. 4 and 5, in order to minimize or reduce the inertial loads on the first and second snubber elements 260, 266 (360, 366) these elements may be tapered extending from the respective first and second blades 214a, 214b (314a, 314b) toward the snubber gap G at the midway point 238 (338). That is, the radial thickness may progressively decrease from the snubber ends 262, 268 (362, 368) toward the midway point 238 (338). In addition, the taper may reduce aerodynamic resistance by providing the snubber elements 260, 266 (360, 366) with a reduced cross-sectional area to flow through the turbine between the blades.

In each of the above-described embodiments, it should be noted that structure is provided for controlling the damping force at a snubber gap between a snubber element and a cooperating surface using a radially inwardly extending configuration to produce a predetermined outwardly directed centrifugal force and a corresponding circumferentially directed damping force at the engaging surfaces.

The present invention is particularly applicable to large diameter, cooled turbine blades designed for high temperature (i.e., 850° C.) applications, such as may be used in industrial gas turbines. The present invention enables application of a controlled damping force through a mid-span snubber structure such as may be required for vibration damping of large diameter blades subjected to increased aerodynamic vibrations wherein the damping structure may provide a greater or lesser force, as required, at the snubber gap by utilizing a predetermined centrifugal force acting on the inwardly angled snubber element or elements.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A damping structure in a turbomachine rotor having a rotor disk and a plurality of blades, the damping structure comprising:

an elongated snubber element including a first snubber end rigidly attached to a first blade and extending toward an adjacent second blade, and an opposite second snubber end positioned adjacent to a cooperating surface at least partly formed on the second blade;

wherein the cooperating surface comprises a circumferentially facing side extending radially and circumferentially outwardly from a radially extending side surface of the second blade, forming an angle extending from the radially extending side surface, and the second snubber end has a surface extending radially outwardly at an angle similar to the angle of the cooperating surface;

the snubber element having a centerline extending radially inwardly in a direction from the first blade toward the second blade along [at least a portion of the snubber element between the first and second snubber ends] *a portion of the snubber element between the first snubber end and a midway point between the first and second blades, and extending radially outwardly from the midway point to the second snubber end*;

wherein the cooperating surface defines an axially extending area for accommodating axial movement of the second snubber end along the cooperating surface as the first and second blades untwist during rotor spin-up; and wherein rotational movement of the rotor effects relative movement between the second snubber end and the cooperating surface to position the second snubber end in frictional engagement with the cooperating surface with a predetermined damping force determined by a centrifugal force on the snubber element.

2. The damping structure according to claim 1, wherein the damping structure is located at a mid-span location between a blade root and a blade tip of the blade.

3. The damping structure according to claim 1, wherein the centerline of the snubber element comprises a substantially smooth curve with a concave side facing radially outwardly extending from the first snubber end to the second snubber end.

4. The damping structure according to claim 1, wherein the centerline of the snubber element comprises first and second linear centerline segments and an inflexion angle between the centerline segments at a midway point between the first and second blades, the first centerline segment angling radially inwardly from the first snubber end to the midway point and the second centerline segment angling radially outwardly from the midway point to the second snubber end.

5. The damping structure according to claim 1, wherein the cooperating surface further comprises a radially inwardly facing side formed on a flange extending from the radially extending side surface of the second blade, the circumferentially facing side and the radially inwardly facing side define a recess for receiving the second snubber end.

6. The damping structure according to claim 1, including a midway point between the first and second blades and a radial thickness of the snubber element decreases extending from each of the blades to the midway point.

7. A mid-span damping structure in a turbomachine rotor having a rotor disk and a plurality of blades, the mid-span damping structure comprising:

an elongated snubber element including a first snubber end rigidly attached to a first blade and extending toward an adjacent second blade, and an opposite second snubber end positioned adjacent to a cooperating surface at least partly formed on a side surface of the second blade and [defining an axially curved bearing surface] *formed with a curvature in the axial direction*;

the snubber element having a centerline extending radially inwardly in a direction from the first blade toward the second blade along a portion of the snubber element between the first end and a midway point between the first and second blades, and extending radially outwardly from the midway point to the second snubber end; and wherein rotational movement of the rotor effects relative movement between the second snubber end and the cooperating surface to position the second snubber end in frictional engagement with the cooperating surface with a predetermined damping force determined by a centrifugal force on the snubber element.

8. The damping structure according to claim 7, wherein the centerline of the snubber element comprises a substantially smooth curve with a concave side facing radially outwardly extending from the first snubber end to the second snubber end.

9. The damping structure according to claim 7, wherein the centerline of the snubber element comprises first and second linear centerline segments and an inflexion angle between the centerline segments at the midway point between the first and second blades, the first centerline segment angling radially inwardly from the first snubber end to the midway point and the second centerline segment angling radially outwardly from the midway point to the second snubber end.

10. The damping structure according to claim 7, wherein the cooperating surface defines [an axially curved] *a* socket area for accommodating axial movement of the second snubber end along the cooperating surface as the first and second blades untwist during rotor spin-up.

11. The damping structure according to claim 10, wherein the cooperating surface comprises a circumferentially facing side at least partially formed on a side of the second blade and a radially inwardly facing side formed on a flange extending from the second blade, the circumferentially facing side and the radially inwardly facing side define a recess for receiving the second snubber end.

12. A damping structure in a turbomachine rotor having a rotor disk and a plurality of blades, the damping structure comprising:

an elongated snubber element including a first snubber end rigidly attached to a first blade and extending toward an adjacent second blade, and an opposite second snubber end positioned adjacent to a cooperating surface at least partly formed on the second blade, a gap being formed between the second snubber end and the cooperating surface when the rotor is stationary;

the snubber element having a centerline extending radially inwardly in a direction from the first blade toward the second blade along at least a portion of the snubber element between the first and second snubber ends;

wherein the centerline of the snubber element comprises first and second linear centerline segments and an inflexion angle between the centerline segments at a midway point on the snubber element between the first and second blades, the first centerline segment angling radially inwardly from the first snubber end to the midway point and the second centerline segment angling radially outwardly from the inflexion angle defined at the midway point to the second snubber end;

wherein the cooperating surface defines an axially extending area for accommodating axial movement of the second snubber end along the cooperating surface as the first and second blades untwist during rotor spin-up; and wherein rotational movement of the rotor effects relative movement between the second snubber end and the cooperating surface to position the second snubber end in frictional engagement with the cooperating surface with a predetermined damping force determined by a centrifugal force on the snubber element.

13. The damping structure according to claim 12, wherein a radial thickness of the snubber element decreases extending from each of the blades to the midway point.

* * * * *